(12) United States Patent
Toeniskoetter

(10) Patent No.: US 7,721,585 B2
(45) Date of Patent: May 25, 2010

(54) INTEGRATED SHEET METAL FORMING, ASSEMBLY AND INSPECTION SYSTEM

(75) Inventor: James B. Toeniskoetter, Rochester Hills, MI (US)

(73) Assignee: Hirotec America, Inc., Auburn Hills, MI (US)

( * ) Notice: Subject to any disclaimer, the term of this patent is extended or adjusted under 35 U.S.C. 154(b) by 530 days.

(21) Appl. No.: 11/725,611

(22) Filed: Mar. 20, 2007

(65) Prior Publication Data

US 2007/0222014 A1 Sep. 27, 2007

Related U.S. Application Data

(60) Provisional application No. 60/784,512, filed on Mar. 21, 2006.

(51) Int. Cl.
*B21J 11/00* (2006.01)
(52) U.S. Cl. .................... 72/405.1; 72/419; 72/214; 72/17.3; 29/430; 29/505; 29/509
(58) Field of Classification Search ............ 72/16.1, 72/16.2, 17.3, 56, 404, 405.01, 419–421; 29/509, 430, 505
See application file for complete search history.

(56) References Cited

U.S. PATENT DOCUMENTS

| | | | | |
|---|---|---|---|---|
| 3,851,139 | A | * | 11/1974 | Rudd .................. 219/101 |
| 5,423,199 | A | * | 6/1995 | Mangrulkar ............. 72/3 |
| 5,910,894 | A | * | 6/1999 | Pryor ................. 700/95 |
| 6,324,880 | B1 | * | 12/2001 | Nakamura ............ 72/17.3 |
| 2004/0245676 | A1 | * | 12/2004 | Zaluzec et al. ....... 264/294 |

* cited by examiner

*Primary Examiner*—Dana Ross
*Assistant Examiner*—Matthew G Katcoff
(74) *Attorney, Agent, or Firm*—Fildes & Outland, P.C.

(57) ABSTRACT

An integrated forming, assembly and inspection system includes a plurality of robotic material conveyors. The integrated system also includes a forming subsystem including sheet metal drawing apparatus, a roller hemming subsystem, and an inspection subsystem. The plurality of robotic material conveyors are operable to convey assembly workpieces to and from the subsystems.

12 Claims, 5 Drawing Sheets

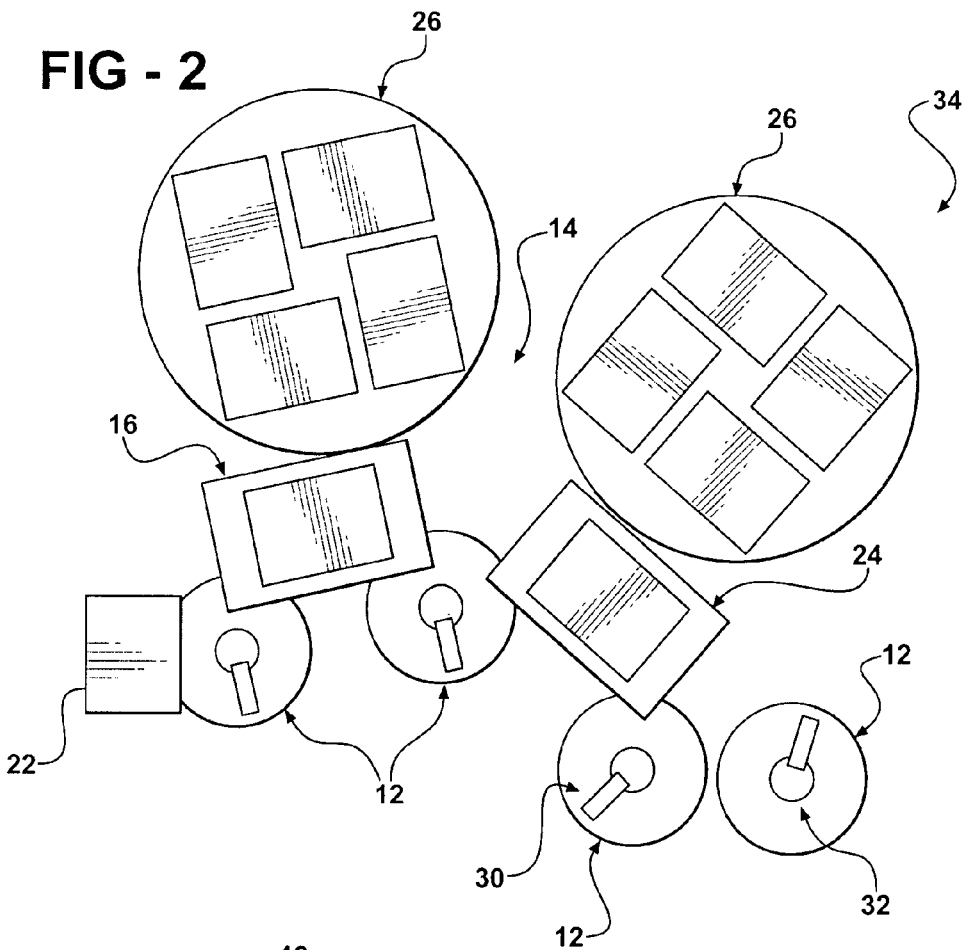
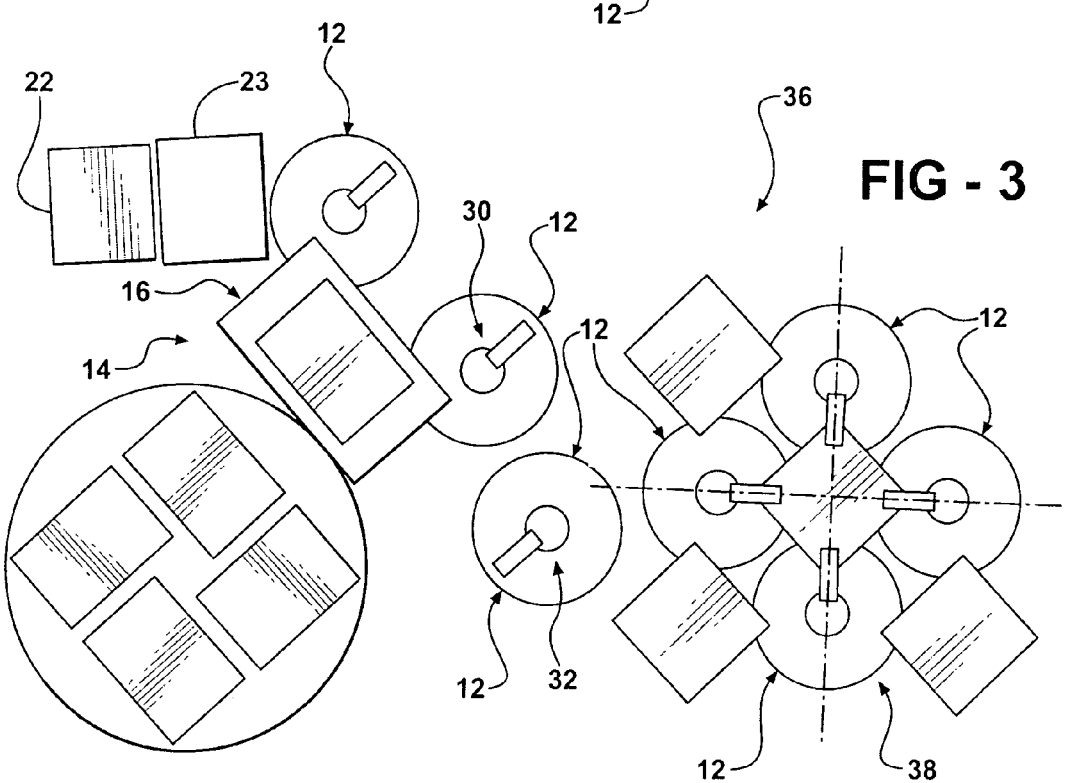

INTEGRATED SHEET METAL FORMING, ASSEMBLY AND INSPECTION SYSTEM

CROSS REFERENCE TO RELATED APPLICATION

This application claims the priority of U.S. Provisional Application No. 60/784,512 filed Mar. 21, 2006.

TECHNICAL FIELD

This invention relates to sheet metal fabrication systems, and more particularly to sheet metal forming, assembly and inspection systems.

BACKGROUND OF THE INVENTION

It is known in the art relating to sheet metal fabrication systems to form, assemble, and inspect vehicle closure panels, such as door panels, hood panels, and decklid panels, in separate distant locations. For example, the panels used for assembly of vehicle closure panels may be formed from sheet metal blanks in one location, transported to another location to assemble the panels into a finished workpiece, and transported to a third location for quality inspection. Further, finished vehicle closure panels are typically shipped from the location at which they are manufactured to a vehicle assembly plant where they are used to assemble vehicles.

The transportation of closure panels during fabrication and from a fabrication location to a vehicle assembly plant is inefficient. Each transportation step results in an expenditure of money and a loss of time. Further, there is a risk of damaging the closure panels during transportation, which also results in a loss of resources.

SUMMARY OF THE INVENTION

The present invention provides an integrated forming, assembly and inspection system. The integrated system combines forming, assembly and inspection into a single production line, increasing the efficiency of vehicle closure panel production processes and increasing the output per hour of finished vehicle closure panels produced from raw sheet metal blanks. Further, the integrated forming, assembly, and inspection system may be located next to or in line with an OEM vehicle assembly plant, increasing the efficiency of an OEM vehicle production process.

More particularly, an integrated forming, assembly, and inspection system in accordance with the present invention includes a plurality of robotic material conveyors. The integrated system also has a forming subsystem including a sheet metal drawing apparatus. The integrated system also includes a roller hemming subsystem and an inspection subsystem. The robotic material conveyors are operable to convey assembly workpieces to and from the subsystems.

Optionally, the integrated system may also include a laser trim subsystem and a magnetic pulse subsystem. The forming subsystem may include a sheet metal drawing apparatus and a sheet metal restrike apparatus. The forming subsystem may also include at least one rotary die changer for changing die used in the forming subsystem.

In a specific embodiment, the integrated system may include first and second sublines arranged in a parallel relationship to each other. The first subline includes a plurality of the robotic material conveyors and a forming subsystem including at least one sheet metal drawing apparatus. The second subline includes a plurality of the robotic material conveyors, a forming subsystem including at least one sheet metal drawing apparatus, and a pre-hemming subsystem. The first and second sublines are arranged in series with the roller hemming subsystem, and the roller hemming subsystem is arranged in series with the inspection subsystem.

In this embodiment, the first subline may optionally include a laser trim subsystem and a magnetic pulse subsystem. The forming subsystem of the first subline may be arranged in series with the laser trim subsystem and the magnetic pulse subsystem.

The second subline may also optionally include a laser trim subsystem and a magnetic pulse subsystem. The forming subsystem of the second subline may be arranged in series with the laser trim subsystem, the magnetic pulse subsystem, and the pre-hemming subsystem.

A method for integrated sheet metal forming, assembly, and inspection includes the steps of: providing a plurality of robotic material conveyors for conveying sheet metal workpieces; introducing a sheet metal blank to a forming subsystem including a sheet metal drawing apparatus to form a sheet metal panel; conveying the sheet metal panel to a laser trim subsystem for robotic laser trimming of the sheet metal panel; conveying the sheet metal panel to a roller hemming subsystem to form a sheet metal assembly; and conveying the sheet metal assembly to an inspection system for robotic inspection of the sheet metal assembly.

Optionally, prior to conveying the sheet metal panel to the roller hemming subsystem, the method may include the step of conveying the sheet metal panel to a magnetic pulse subsystem for magnetic pulse piercing of the sheet metal panel. Also, prior to conveying the sheet metal panel to the roller hemming subsystem, the method may include the step of conveying the sheet metal panel to a pre-hemming subsystem.

These and other features and advantages of the invention will be more fully understood from the following detailed description of the invention taken together with the accompanying drawings.

BRIEF DESCRIPTION OF THE DRAWINGS

In the drawings:

FIG. 2 is a schematic illustration of a first subline of the integrated system of FIG. 1;

FIG. 3 is a schematic illustration of a second subline of the integrated system of FIG. 1;

DETAILED DESCRIPTION OF THE INVENTION

Figure 1:
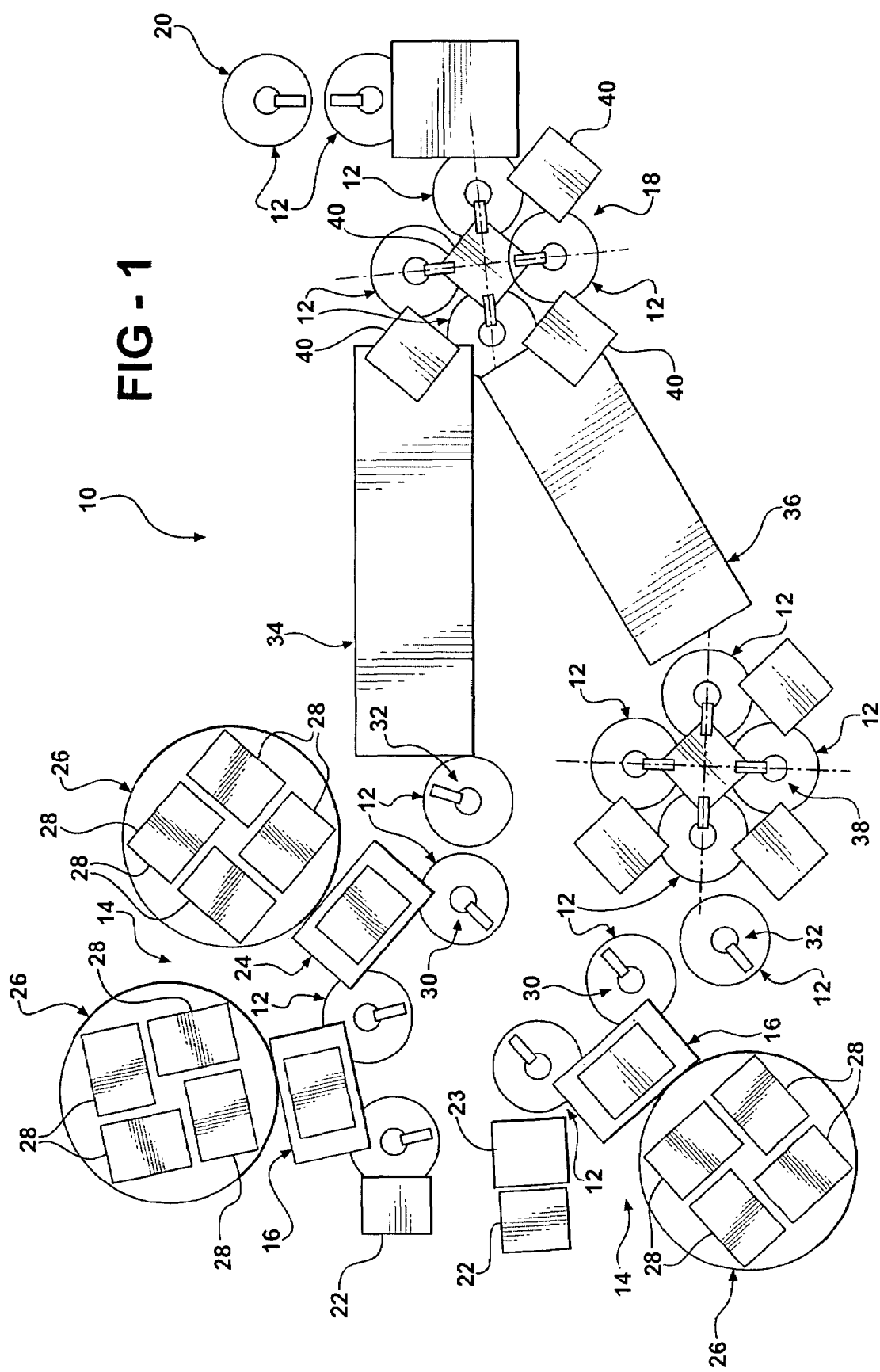
FIG. 1 is a schematic illustration of an integrated forming, assembly, and inspection system in accordance with the present invention.

Referring now to the drawings in detail, numeral 10 generally indicates an integrated forming, assembly, and inspection system in accordance with the present invention. The integrated forming, assembly, and inspection system 10 includes a plurality of robotic material conveyors 12 such as multi-axis robotic arms or similar. The integrated system 10 also has a forming subsystem 14 including sheet metal drawing apparatus 16. The integrated system 10 also includes a roller hemming subsystem 18 and an inspection subsystem 20. The robotic material conveyors 12 are operable to convey assembly workpieces, such as sheet metal vehicle closure panels 22, to and from the subsystems.

The sheet metal drawing apparatus 16 of the forming subsystem 14 may be a vertical draw press, but preferably is a horizontal draw press. The forming subsystem 14 may also include a sheet metal restrike apparatus 24. Further, the forming subsystem 14 may include at least one rotary die changer 26 for changing the die used by the sheet metal drawing apparatus 14 and sheet metal restrike apparatus 24. Each rotary die changer 26 includes a plurality of dies 28 that are interchangeable on the drawing apparatus 14 or restrike apparatus 24.

Figure 4:
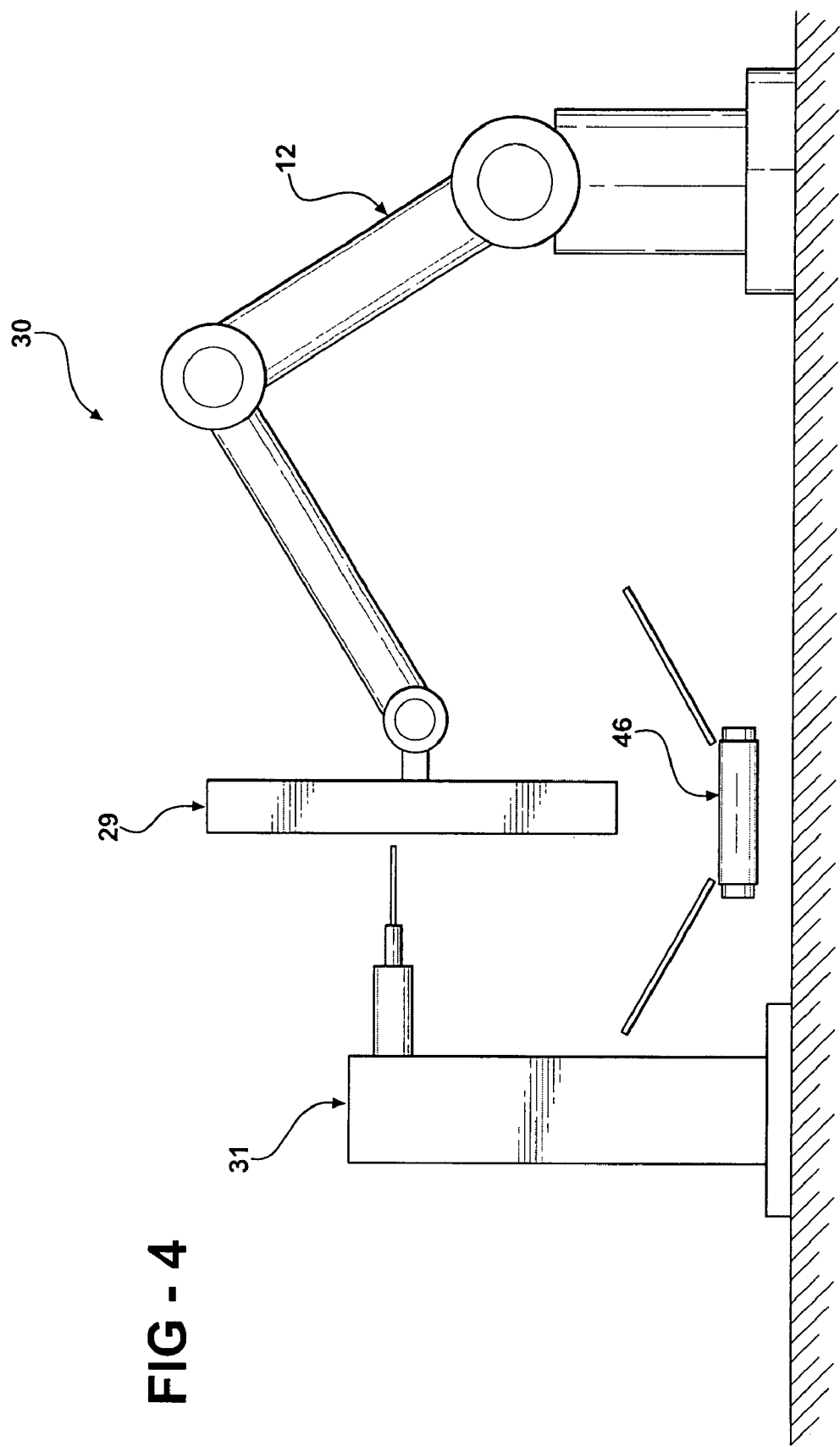
FIG. 4 is a schematic illustration of a laser trim subsystem of the integrated system of FIG. 1.
Figure 5:
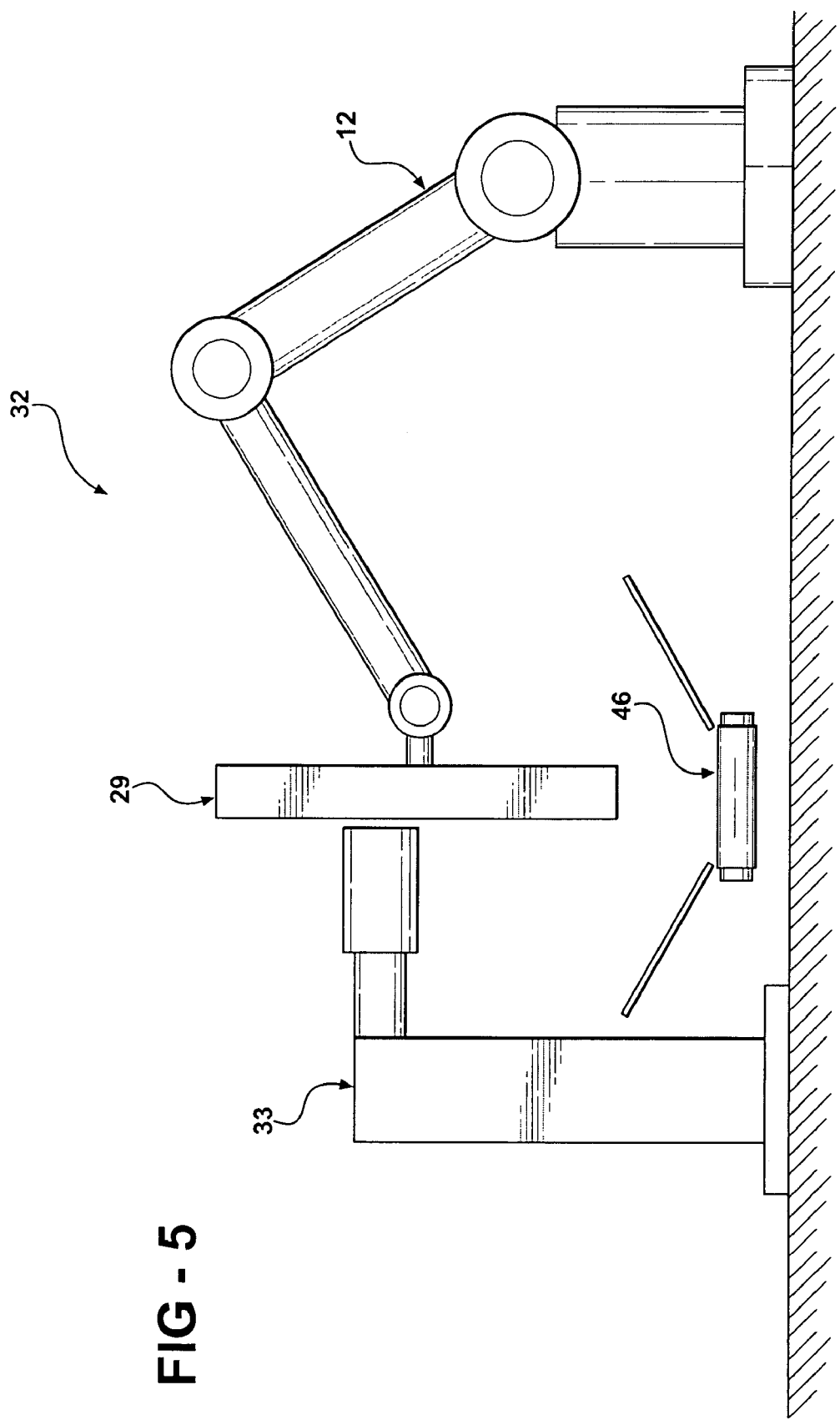
FIG. 5 is a schematic illustration of a magnetic pulse subsystem of the integrated system of FIG. 1.

The integrated system 10 may also include a laser trim subsystem 30, such as a robotic pedestal laser trim apparatus, and a magnetic pulse subsystem 32, such as a robotic pedestal magnetic pulse piercing apparatus. For example, as shown in FIG. 4 the laser trim subsystem 30 may include a stationary laser 31 for cutting workpieces 29 and a robot 12 that manipulates the workpieces relative to the laser to effect the desired cuts. Similarly, as shown by example in FIG. 5, the magnetic pulse subsystem 32 may include a stationary magnetic pulse apparatus 33 and a robot 12 that manipulates the workpieces 29 relative to the magnetic pulse apparatus to pierce holes in desired locations of the workpieces. The laser trim subsystem 30 and magnetic pulse subsystem 32 each may also include a scrap conveyor 46 for conveying scrap metal away from the subsystems.

In a specific embodiment, the integrated system 10 may include a first subline 34 and a second subline 36 that are arranged in a parallel relationship to each other. The first and second sublines 34, 36 may be arranged in series with the roller hemming subsystem 18, which may in turn be arranged in series with the inspection subsystem 20.

As shown in FIGS. 1 and 2, the first subline 34 includes a plurality of the robotic material conveyors 12 and a forming subsystem 14 including at least one sheet metal drawing apparatus 16. The forming subsystem 14 may also include a sheet metal restrike apparatus 24 and at least one rotary die changer 26. The first subline 34 may also include a laser trim subsystem 30 and a magnetic pulse subsystem 32 as described above. The forming subsystem 14 may be arranged in series with the laser trim subsystem 30 and the magnetic pulse subsystem 32.

As shown in FIGS. 1 and 3, the second subline 36 may include a plurality of the robotic material conveyors 12, a forming subsystem 14 including at least one sheet metal drawing apparatus 16, and a pre-hemming subsystem 38. The second subline 36 may also include a laser trim subsystem 30 and a magnetic pulse subsystem 32. Optionally, a second laser trim subsystem may be used in place of the magnetic pulse subsystem 32. The forming subsystem 14, the laser trim subsystem 30, the magnetic pulse subsystem 32, and the pre-hemming subsystem 38 may be arranged in series.

Referring now to FIGS. 1 through 3, the integrated forming, assembly, and inspection system 10 may be used to manufacture vehicle closure panels from raw sheet metal blanks. For instance, the first subline 34 may be used to form an inner vehicle panel while the second subline 36 may be used to form an outer vehicle panel. Downstream of the first and second sublines 34 and 36, the inner and outer panels may be hemmed together in the roller hemming subsystem 18 to assemble a finished vehicle closure panel. Downstream of the roller hemming subsystem 18, the vehicle closure panel may be inspected for conformance with tolerances in the inspection subsystem 20.

More specifically, a sheet metal blank 22 for forming an inner closure panel may be fed to a first robotic material conveyor 12 in the forming subsystem 14 of the first subline 34. The rotary die changer 26 may then be used to select a desired die 28 for the sheet metal drawing apparatus 16. The robotic conveyor 12 then moves the sheet metal blank 22 into the sheet metal drawing apparatus 16 to form an inner vehicle closure panel. The next robotic conveyor 12 then engages the inner panel. Another rotary die changer 26 may then be used to select a desired die 28 for the sheet metal restrike apparatus 24. The robotic conveyor 12 then inserts the inner panel into the restrike apparatus 24 to further form the inner panel. The next robotic conveyor 12 then engages the inner panel to transfer the inner panel to the laser trim subsystem 30. In the laser trim subsystem 30, a laser is used to trim excess metal from the inner panel. The next robotic conveyor 12 then transfers the inner panel from the laser trim subsystem 30 to the magnetic pulse subsystem 32. In the magnetic pulse subsystem 32, a magnetic pulse apparatus is used to magnetic pulse pierce the inner panel in order to finish preparing the inner panel for assembly of a completed vehicle closure panel.

Likewise, concurrent with the first subline 34, a sheet metal blank 22 for forming an outer closure panel may be fed to a first robotic material conveyor 12 in the forming subsystem 14 of the second subline 36. Prior to entering the forming subsystem 14, the outer metal blank 22 may be washed by a blank washer 23. The rotary die changer 26 may then be used to select a desired die 28 for the sheet metal drawing apparatus 16 of the second subline 36. The robotic conveyor 12 then transfers the sheet metal blank 22 into the sheet metal drawing apparatus 16 to form an outer vehicle closure panel. The next robotic conveyor 12 engages the outer panel to transfer the outer panel to the laser trim subsystem 30. In the laser trim subsystem 30, a laser is used to trim excess metal from the outer panel. The next robotic conveyor 12 then transfers the outer panel from the laser trim subsystem 30 to the magnetic pulse subsystem 32. In the magnetic pulse subsystem 32, a magnetic pulse apparatus is used to magnetic pulse pierce the outer panel. Alternatively, another laser trim subsystem may be used in place of the magnetic pulse subsystem 32. The next robotic conveyor 12 then transfers the outer panel to the pre-hemming subsystem 38. The pre-hemming subsystem 38 includes a pre-hemming apparatus for pre-hemming the outer panel prior to transfer of the outer panel to the roller hemming subsystem 18.

Next, the inner panel formed in the first subline 34 and the outer panel formed in the second subline 36 are transferred by robotic conveyors 12 to the roller hemming subsystem 18. In the roller hemming subsystem 18, robotic arms of robotic conveyors 12 having an attached roller hemming tool are used with anvils 40 to roller hem the outer panel to the inner panel. After robotic roller hemming in the roller hemming subsystem 18, the finished, hemmed vehicle closure panel is transferred by another robotic conveyor 12 to the inspection subsystem 20. In the inspection subsystem 20, the finished vehicle closure panel may be robotically inspected for conformance with pre-specified design tolerances. If the finished vehicle closure panel passes the inspection, it may then be transferred to an OEM vehicle assembly plant for assembly into a vehicle.

Figure 6:
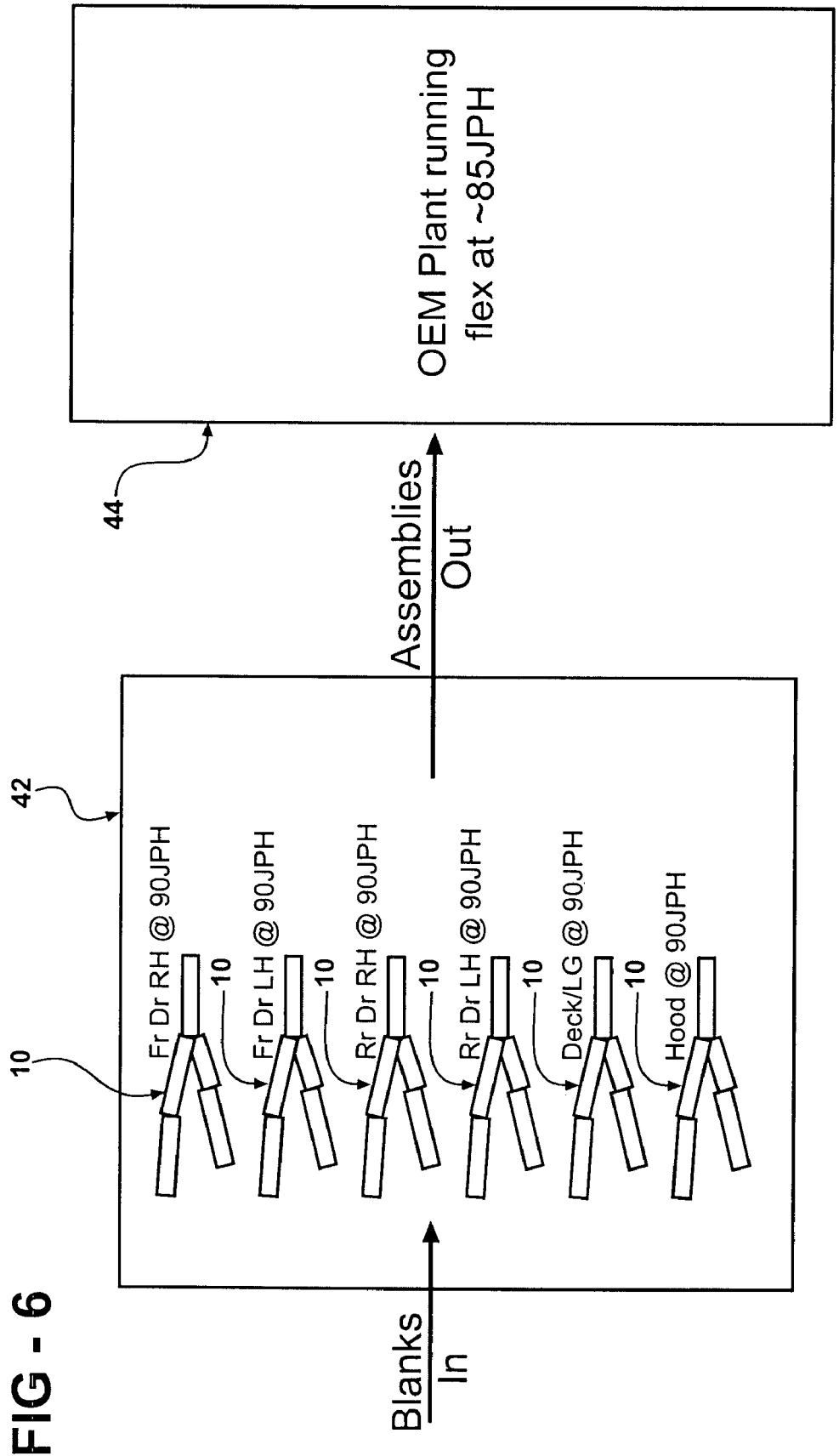
FIG. 6 is a schematic illustration of an assembly process including the integrated system of FIG. 1.

Turning to FIG. 6, a vehicle closure panel manufacturing plant 42 may include a plurality of separately operational integrated forming, assembly, and inspection systems 10. Each integrated system 10 may be used to manufacture a specific type of vehicle closure panel, such as right hand side front door panels, left hand side front door panels, right hand side rear door panels, left hand side rear door panels, decklid panels, hood panels, or similar. Further, each integrated system 10 may be capable of manufacturing a variety of designs of a specific type of vehicle panel, such as a variety of right hand side front door panels for use in manufacturing a variety of different vehicle models.

Raw sheet metal blanks are fed into the closure panel plant 42, and finished vehicle closure panel assemblies are outputted from the plant 42. The closure panel plant 42 may also be advantageously located in proximity to an OEM vehicle assembly plant 44 so that the outputted finished vehicle closure panel assemblies may be directly transferred to the assembly line of the OEM plant 44 for assembly into a vehicle. The closure panel plant 42 is capable of producing finished vehicle closure panels at a rate equal to or greater than the production rate of the OEM vehicle assembly plant 44. The vehicle closure panel plant 42 is therefore able to meet the production demands of the OEM plant 44.

Alternatively, a vehicle closure panel manufacturing plant may include a single integrated forming, assembly, and inspection system 10. In this embodiment, the single integrated system 10 is used to manufacture all of the vehicle closure panels needed to assemble a vehicle, such as the front and rear door panels, decklid panels, hood panels, or similar. This vehicle closure panel manufacturing plant design may be especially useful in conjunction with an OEM vehicle plant that is operating to assemble a single type of vehicle.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An integrated forming, assembly and inspection system comprising:
    a plurality of robotic material conveyors;
    first and second sublines arranged in a parallel relationship to each other;
    said first subline including a plurality of said robotic material conveyors and a forming subsystem including at least one sheet metal drawing apparatus;
    said second subline including a plurality of said robotic material conveyors, a forming subsystem including at least one sheet metal drawing apparatus, and a pre-hemming subsystem;
    a roller hemming subsystem; and
    an inspection subsystem;
    said first and second sublines being arranged in series with said roller hemming subsystem, and said rolling hemming subsystem being arranged in series with said inspection subsystem;
    said plurality of robotic material conveyors being operable to convey assembly workpieces to and from said subsystems.

2. The integrated system of claim 1, including a laser trim subsystem.

3. The integrated system of claim 1, including a magnetic pulse subsystem.

4. The integrated system of claim 1, wherein said forming subsystem includes a sheet metal restrike apparatus.

5. The integrated system of claim 1, wherein said forming subsystem includes at least one rotary die changer for changing die used in said forming subsystem.

6. The integrated system of claim 1, wherein said first subline includes a laser trim subsystem and a magnetic pulse subsystem.

7. The integrated system of claim 6, wherein said forming subsystem of said first subline is arranged in series with said laser trim subsystem and said magnetic pulse subsystem.

8. The integrated system of claim 1, wherein, said second subline includes a laser trim subsystem and a magnetic pulse subsystem.

9. The integrated system of claim 8, wherein said forming subsystem of said second subline is arranged in series with said laser trim subsystem, said magnetic pulse subsystem, and said pre-hemming subsystem.

10. A method for integrated sheet metal forming, assembly, and inspection, the method comprising:
    providing a plurality of robotic material conveyors for conveying sheet metal workpieces; first and second sublines arranged in a parallel relationship to each other; said first subline including a plurality of said robotic material conveyors and a forming subsystem including at least one sheet metal drawing apparatus: said second subline including a plurality of said robotic material conveyors, a forming subsystem including at least one sheet metal drawing apparatus, and a pre-hemming subsystem; a roller hemming subsystem; and an inspection subsystem; said first and second sublines being arranged in series with said roller hemming subsystem, and said rolling hemming subsystem being arranged in series with said inspection subsystem;
    introducing a sheet metal blank to said forming subsystem of said first subline and said forming subsystem of said second subline to form sheet metal panels;
    conveying said sheet metal panels to a laser trim subsystem for robotic laser trimming of said sheet metal panel;
    conveying said sheet metal panels to said roller hemming subsystem to form a sheet metal assembly; and
    conveying said sheet metal assembly to said inspection system for robotic inspection of said sheet metal assembly.

11. The method of claim 10, including the step of:
    prior to conveying said sheet metal panels to said roller hemming subsystem, conveying said sheet metal panels to a magnetic pulse subsystem for magnetic pulse piercing of said sheet metal panels.

12. The method of claim 10 including the step of:
    prior to conveying said sheet metal panel in said second subline to said roller hemming subsystem, conveying said sheet metal panel to said pre-hemming subsystem.

* * * * *